United States Patent

[11] 3,625,356

[72] Inventor Aldrich L. Jackson
  Eustis, Fla.
[21] Appl. No. 44,399
[22] Filed June 8, 1970
[45] Patented Dec. 7, 1971
[73] Assignee Dynasort Corporation
  Continuation-in-part of application Ser. No. 707,164, Feb. 21, 1968, now abandoned. This application June 8, 1970, Ser. No. 44,399

[54] APPARATUS FOR CONTINUOUSLY SORTING LONG, SLENDER ARTICLES BY LENGTH
  20 Claims, 8 Drawing Figs.
[52] U.S. Cl. .................................................. 209/73, 209/97
[51] Int. Cl. .................................................... B07c 1/14
[50] Field of Search .......................................... 209/73, 97; 193/43; 198/33 AD

[56] References Cited
  UNITED STATES PATENTS
  3,389,790  6/1968  Braunheim et al............  209/97
  3,545,613  12/1970  Nystuen .......................  209/97

Primary Examiner—Allen N. Knowles
Attorney—Hofgren, Wegner, Allen, Stellman & McCord ABSTRACT: Apparatus for rapidly and continuously sorting relatively long, slender articles, such as silverware, into a plurality of categories which are differentiated by the length of the articles in each category.

All the articles, which may be pieces of silverware, drop endwise from an inclined delivery chute into a restricted indexing area of an indexing surface, and the indexing area is so tilted that the upper ends of the articles swing outwardly by gravity toward a series of vertically spaced, transversely extending gauge bars. Inclined sorting troughs for short pieces (spoons), intermediate pieces (forks), and long pieces (knives) extend downwardly from the outer margin of the indexing surface, and the gauge bars are so arranged that short pieces swing beneath all the bars directly into a first trough, the upper end portions of the intermediate pieces slide along a lower gauge bar which spans the first trough and terminates alongside a second trough into which those pieces fall; while the upper end portions of the long pieces slide along an upper gauge bar which is above the tips of the intermediate pieces and spans both the first and second troughs, so such long pieces fall into a third trough. If necessary, four troughs and three gauge bars may be provided; and there may be one or more secondary sorting stages, similar to the first, if needed.

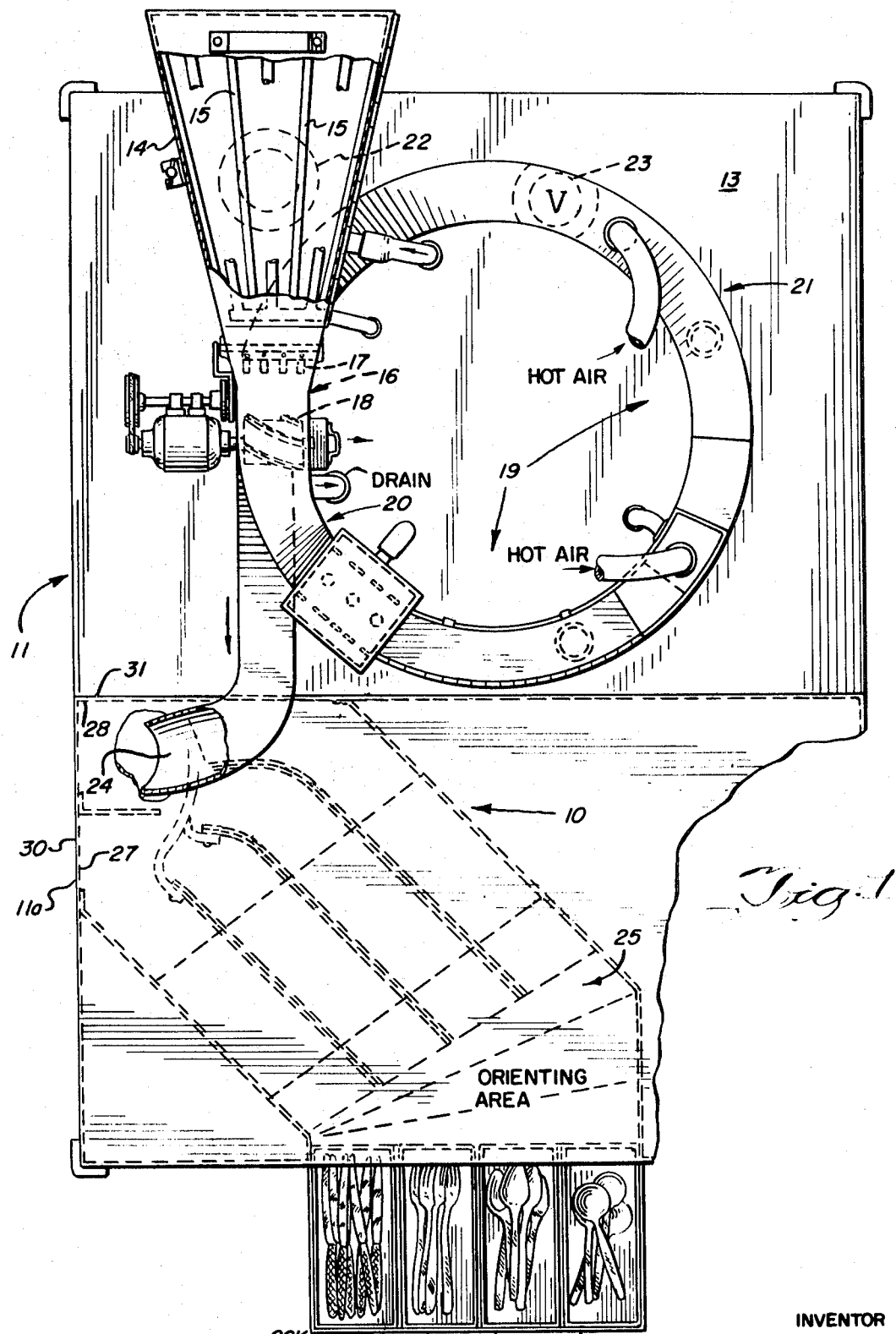

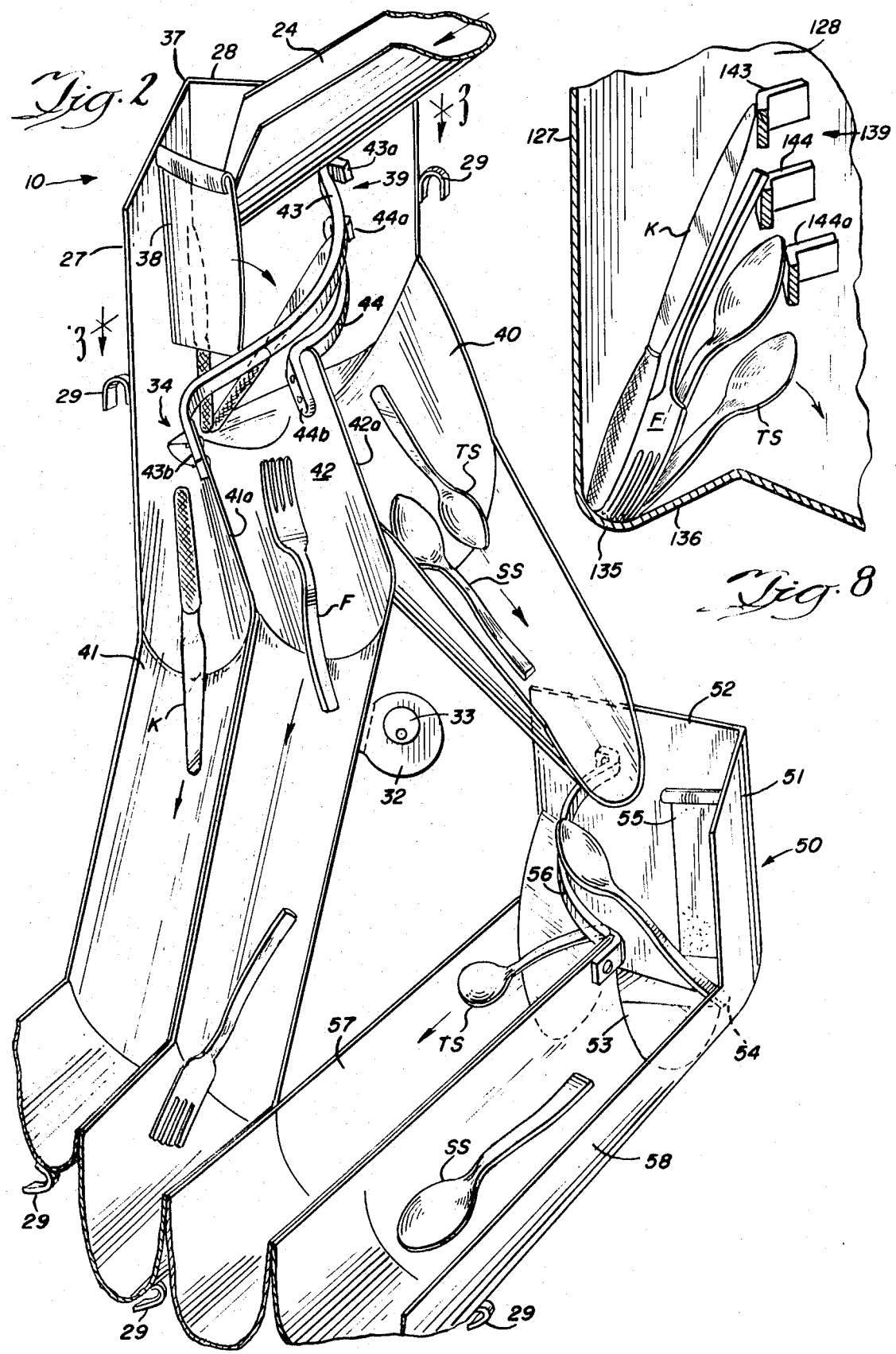

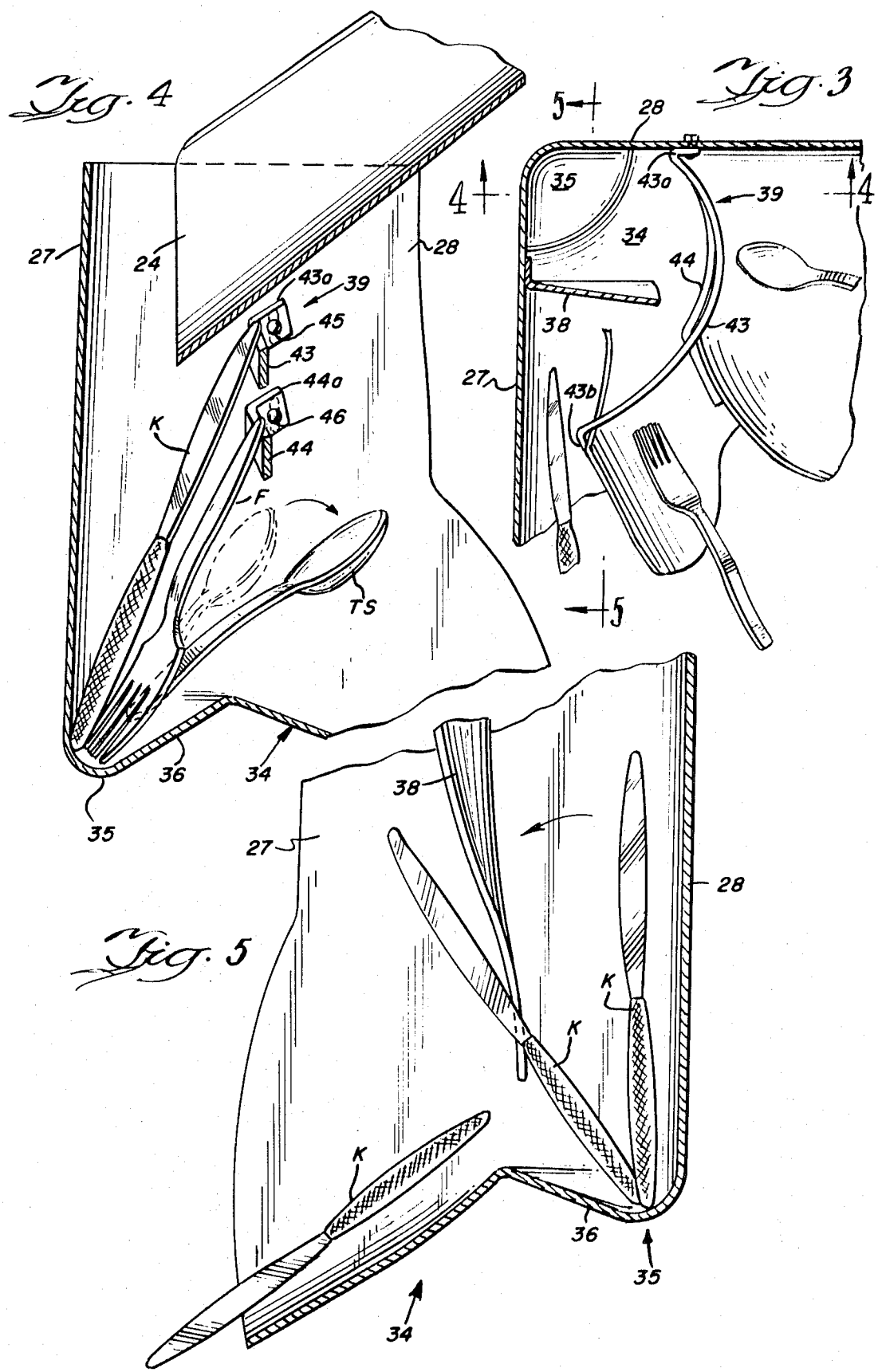

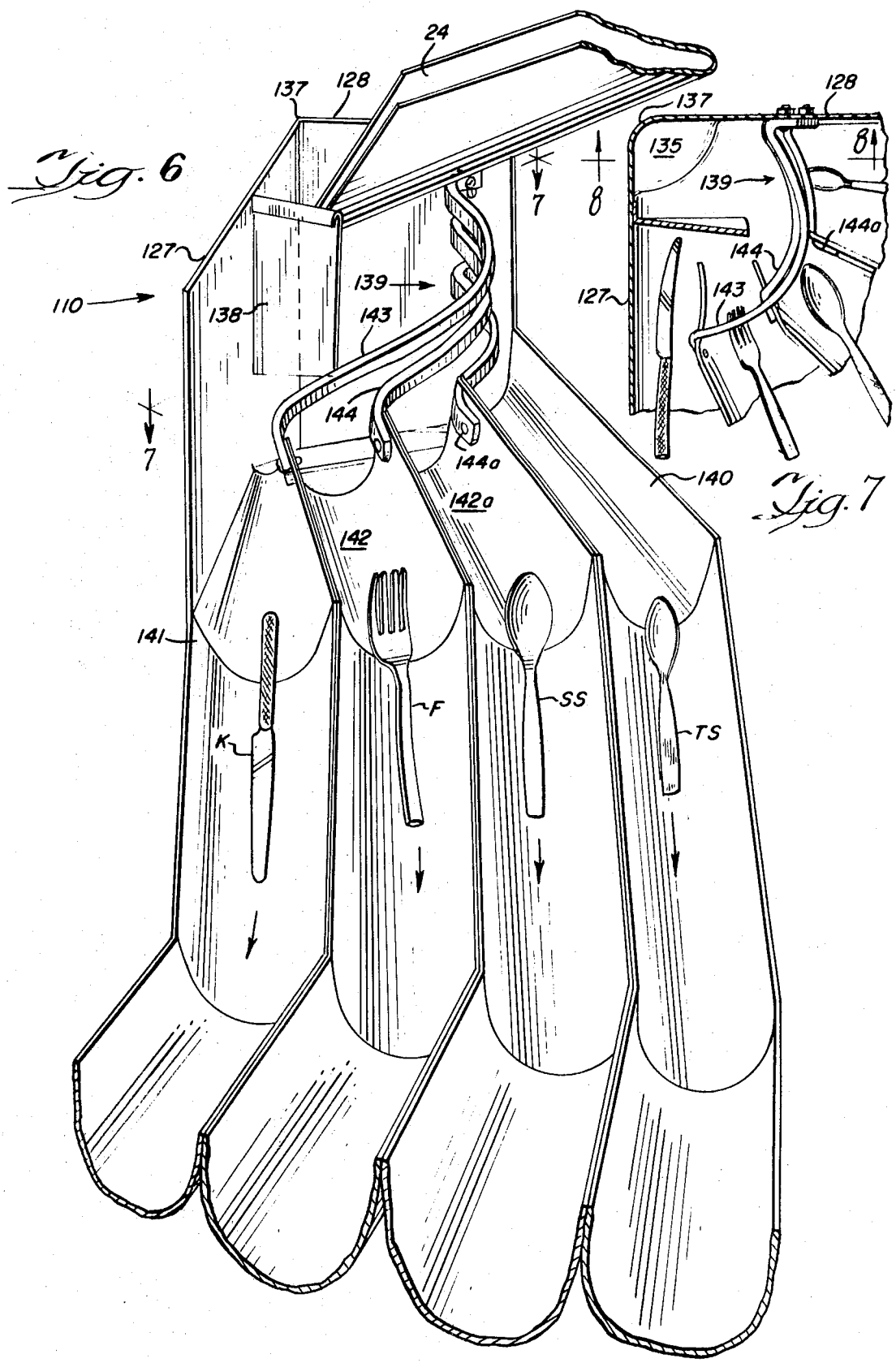

APPARATUS FOR CONTINUOUSLY SORTING LONG, SLENDER ARTICLES BY LENGTH

CROSS-REFERENCE TO RELATED APPLICATIONS

The present sorting apparatus is particularly designed to receive a stream of mixed silverware from a continuous silverware washing apparatus such as that disclosed and claimed in my copending application Ser. No. 50,466, filed June 29, 1970; and the sorting troughs are particularly designed to feed directly into Silverware Orienting Apparatus such as that disclosed and claimed in my copending application Ser. No. 28,879, filed Apr. 15, 1970 as a continuation-in-part of my application Ser. No. 707,164, now abandoned filed Feb. 21, 1968.

BACKGROUND OF THE INVENTION

With the increasing cost and relative unavailability of dependable unskilled help in the labor market, and further as a result of the overall increase in the cost of all operations where relatively expensive raw materials are a major part of the total cost of doing business, it is becoming increasingly necessary for enterprises engaged in mass food service operations to have dependable equipment which minimizes the service portion of the operation. This applies to restaurants, hotel dining rooms, hospitals and institutions of all sorts, and industrial food service operations. One of the major phases of the mass food service business in which unskilled help has customarily been used is in the washing, drying, and sorting of dishes and silverware. Large capacity industrial dishwashing equipment has been available for many years; but most of it is not readily adaptable to the handling of silverware, and accordingly such operations on silverware have, for the most part, continued to be performed by hand. Both economic and sanitary considerations are in favor of the mechanical handling of silverware.

Soiled silverware must go through five operations in order to return it to supply boxes ready to be reused, and each of these operations must be carried out in such a way as to minimize the risk of damage to the silverware, as by bending the tines of forks or the blades of knives, or bending spoon handles so as to change the angle between the handle and the bowl. These five operations are: (1) washing, (2) rinsing, (3) drying, (4) sorting, and (5) orienting to place the handles of all pieces at the same end of the supply box. In approximately the past 5 years several types of apparatus have been developed for performing one or more, or all of the foregoing processing steps. Reference is made to Kraeft U.S. Pat. Nos. 3,247,858, and 3,339,564, for two related mechanisms which are intended to perform all five operations. Various types of apparatus for sorting silverware are disclosed in Stutz U.S. Pat. No. 3,301,397, Bossung U.S. Pat. No. 3,331,507, Slayton U.S. Pat. No. 3,389,711, Braunheim et al. 3,389,790, Naslund et al. U.S. Pat. No. 3,389,791 and Jackson U.S. Pat. No. 3,395,795.

All of the silverware sorting devices disclosed in the above-identified patents have relatively complex arrangements of pivoting or rotating components, or have moving conveyor belts, which are expensive, cumbersome, and generally rather slow in operation.

SUMMARY OF THE INVENTION

In accordance with the present invention, silverware sorting means is provided which requires no moving parts except for some means ahead of the sorting apparatus to spread the silverware into a dispersed stream so that it is received by the apparatus in manageable quantities, and except for a simple vibrator provided by, for example, an electric motor with an eccentrically weighted shaft, to vibrate the entire sorting apparatus as a unit in order to minimize the likelihood that pieces of silverware may be jammed in the apparatus.

When the apparatus of the present invention is used in conjunction with the continuous silverware washing, rinsing and drying apparatus as disclosed and claimed in my copending application Ser. No. 50,466, filed June 29, 1970, the action of that apparatus as it feeds silverware continuously through the washing, rinsing and drying operations inherently feeds the silverware into the sorter of the present invention in a dispersed stream which assures that it passes through the sorting apparatus in manageable quantities.

Silverware entering the present apparatus in a dispersed stream passes through the sorting apparatus by gravity at a high speed, and each of the sorting troughs may constitute the receiving trough for the silverware orienting means disclosed and claimed in my application Ser. No. 28,879, filed Apr. 15, 1970.

If the present apparatus is not used with the washing, rinsing and drying apparatus of my copending application, then any means may be used to assure that silverware enters this apparatus so as to traverse the delivery chute endwise in a sufficiently dispersed stream that it does not tend to clog the indexing area.

DESCRIPTION OF THE DRAWINGS

FIG. 1 is a generally schematic plan view of the silverware sorting apparatus combined with a washing apparatus, and illustrating silverware in supply boxes as delivered from the sorter and an orienter;

FIG. 2 is a perspective view of a first embodiment of the sorting apparatus;

FIG. 3 is a fragmentary sectional view taken substantially as indicated along the line 3—3 of FIG. 2;

FIG. 4 is a fragmentary sectional view on an enlarged scale taken substantially as indicated along the line 4—4 of FIG. 3;

FIG. 5 is a fragmentary sectional view on an enlarged scale, taken substantially as indicated along the line 5—5 of FIG. 3;

FIG. 6 is a perspective view of a second embodiment of the sorting apparatus;

FIG. 7 is a fragmentary sectional view taken substantially as indicated along the line 7—7 of FIG. 6; and FIG. 8 is a fragmentary sectional view on an enlarged scale, taken substantially as indicated along the line 8—8 of FIG. 7.

DETAILED DESCRIPTION OF THE INVENTION

Referring to the drawings in greater detail, and referring first to FIG. 1, the sorting apparatus of the present invention, indicated generally at 10, is mounted in a cabinet, indicated generally at 11, of which it occupies the front portion 11a. Silverware washing apparatus, indicated generally at 12, is mounted on the top 13 of the cabinet and provides means for orienting silverware for endwise movement into the sorting apparatus 10, and for dispersing it longitudinally along its path of travel into the sorting apparatus.

The washing apparatus is disclosed in detail and claimed in my copending application Ser. No. 50,466, filed June 29, 1970. It is sufficient for present purposes to state that it includes a washing compartment 14 having longitudinally converging partitions 15 which guide silverware so as to orient it for endwise movement, silverware dispersing means, indicated generally at 16, which includes oscillating fingers 17 and a forwarding roller 18; a finishing tunnel, indicated generally at 19, which includes rinsing tunnel apparatus 20 and drying tunnel apparatus 21. The washing compartment 14 and rinsing tunnel 20 are resiliently mounted so that they may be directionally vibrated by a vibrator 22 to move silverware continuously through the washing compartment 14 and the rinsing tunnel 20; while the drying tunnel 21 is independently resiliently mounted so as to be directionally vibrated by a vibrator 23, so that silverware is continuously moved through the drying tunnel 21 and out an open discharge end of the latter which is directly connected with an infeed chute 24 of the sorting apparatus.

After silverware has passed through the sorting apparatus 10 the sorted pieces pass through what is designated in FIG. 1 as an orienting area 25 which contains orienting apparatus of the kind disclosed and claimed in my copending application Ser. No. 28,879, filed Apr. 15, 1970 so that the sorted pieces, consisting of knives D, forks F, soupspoons SS, and teaspoons TS all enter their respective supply boxes 26K, 26F, 26SS and 26TS with their handles leading. Accordingly, any one or more pieces of silverware may be manually removed from a supply box without touching the food manipulating end portion of any other piece of silverware.

Referring now specifically to FIGS. 2 to 5, which illustrates a first embodiment of the invention, the sorting apparatus 10 includes a pair of right angularly related sidewalls 27 and 28 provided with stiffly resilient brackets 29 by means of which they are secured to a sidewall 30 and a transverse intermediate wall 31 of the cabinet 11. Additional stiffly resilient brackets 29 at the bottom of the sorting apparatus 10 are secured to fixed brackets, or pedestals (not shown) that are rigidly mounted in the front portion 11a of the cabinet 11 so that the entire sorting apparatus 10 may be vibrated by a small electric motor 32 having an eccentrically weighted shaft 33.

Between the walls 27 and 28 is a generally transversely extending indexing surface, indicated generally at 34, which includes a restricted indexing area, or picket 35 which is defined by a rearwardly inclined portion 36 of the surface 34 and the junction 37 of the walls 27 and 28. A guide panel 38 is mounted upon the wall 27 in a generally upright position; and as seen in FIGS. 2, 3 and 5 the guide panel is so located that pieces of silverware entering the sorting apparatus 10 from the delivery chute 24 are guided by it and by the sidewalls 27 and 28 into the indexing pocket 3 5. The guide panel 38 has a somewhat twisted shape, as seen in FIG. 5, so that a piece of silverware, such as a knife K, which drops endwise into the pocket 35 and pivots about its lower end so that it is swung by gravity as illustrated in FIG. 5, will be guided by the guide panel 38 toward a set of gauge bars, indicated generally at 39, that cooperate with the indexing pocket 35 to cause teaspoons and soupspoons to enter a short article trough 40, knives to enter a long article trough 41, and forks to enter an intermediate article trough 42 which is between the short and the long article troughs.

As best seen in FIGS. 2 and 3, the gauge bar means 39 includes a long article gauge bar 43 and an intermediate article gauge bar 44 which are mounted one above the other with the long article gauge bar spanning both the short article trough 40 and the intermediate article trough 42, while the intermediate article gauge bar 44 spans only the short article trough 40. Accordingly, the gauge bar 43 has one end 43a fastened to the wall 28 and the opposite end 43b which is fastened to the wall 28 and the opposite end 43b which is fastened to the side 41a of the long article trough which is nearer to the short article trough 40; while, in turn, the gauge bar 44 has a first end 44a that is secured to the wall 28 and a second end 44b that is secured to the side 42a of the intermediate article trough 42 that is nearer to the short article trough 40. Furthermore, each of the gauge bars 43 and 44 forms an arc of a circle the center of which is at the bottom of the indexing pocket 35; and each of the bars is so inclined from its first end 43a or 44a to its second end 43b or 44b that as the upper ends of articles such as the knife K and the fork F in FIG. 4 slide along the respective gauge bars tilting progressively farther from the wall 28, their upper end portions continue to be supported by the gauge bars until such upper ends slide off the free ends of the respective gauge bars and the pieces topple off into the respective long article trough 41 or intermediate article trough 42, as the case may be.

The intermediate article gauge bar 44 is so positioned that short articles consisting of teaspoons and soupspoons swing beneath it and fall directly into the short article trough 40, while the upper end portions of intermediate length articles rest against the intermediate gauge bar 44. The long article gauge bar 43, in turn, is so positioned that the upper ends of intermediate length articles swing beneath it so that articles may topple into the intermediate article trough 42; while the upper end portions of long articles reset against the long article gauge bar 43 and are supported by it so that such articles pass across the intermediate article trough 42 and fall into the long article trough 41.

In order that the sorting apparatus 10 may be adjusted for use with silverware of various lengths, the long article gauge bar 43 and the intermediate article gauge bar 44 are both mounted for vertical adjustment as indicated by the slots 45 and 46 in FIG. 4. Instead of a slotted mounting, of course, the wall 28 and the sides 41a and 42a of the troughs may be provided with vertically spaced holes to receive the mounting screws for the gauge bars.

As seen in FIg. 2, separation of teaspoons TS and soupspoons SS, both of which enter the short article trough 40, is accomplished by an auxiliary indexing apparatus, indicated generally at 50, which is generally the same in construction as the primary sorting apparatus heretofore described. Thus, there are walls 51 and 52 disposed at right angles to one another, a generally transversely extending indexing surface 53 which cooperates with the walls 51 and 52 to form an indexing pocket 54; and a guide panel 55 cooperates with the walls 51 and 52 to guide teaspoons and soupspoons from the trough 40 so that their leading ends drip into the indexing pocket 54. A single gauge bar 56 is so positioned relative to the pocket 54 that teaspoons TS which have their upper ends swing out of the pocket fall completely beneath the gauge bar 56 and topple into an auxiliary shorter article trough 57, while soupspoons SS have their upper end portions rest against the gauge bar 56 and slide along that gauge bar until they slide off its free end and the soupspoons topple into an auxiliary longer article trough 58.

The articles of silverware in troughs 41, 42, 57 and 58 all pass through orienting apparatus, as heretofore stated, so that they all enter their respective supply boxes handle first as seen in FIG. 1.

Referring now to FIGS. 6, 7 and 8, which illustrate a second form of the sorting apparatus which is designated generally by the reference number 110, the apparatus is seen to contain the same structural and functional principles are found in the first embodiment 10; but the four primary categories of silverware consisting of knives K, forks F, soupspoons SS and teaspoons TS are sorted in a single operation by an apparatus which has four troughs and three gauge bars, as distinguished from the first embodiment in which there is an auxiliary sorting to separate the teaspoons and the soupspoons. The second embodiment of the apparatus is mounted for vibratory movement in the same manner as is the first embodiment, but neither the brackets nor the vibrator are shown in FIGS. 6, 7 and 8.

Walls 127 and 128 which are disposed at right angles with respect to one another cooperate with an inclined portion 136 of a generally transverse indexing surface 134 to provide an index pocket 135 which is in the angle 137 between the walls 127 and 128. A guide panel 138 cooperates with the walls 127 and 128 to guide the lower ends of pieces of silverware from the delivery chute 124 into indexing pocket 135.

Gauge bar means, indicated generally at 139, sorts articles into a short article trough 140, a long article trough 141, a long intermediate article trough 142, and a short intermediate article trough 142a.

The gauge bar means 139 includes a long article gauge bar 143, a long intermediate article gauge bar 144, and a short intermediate article gauge bar 144a. As seen in FIG. 8, the positions of the respective gauge bars with respect to the indexing pocket 135 are such that teaspoons TS swing beneath the lowermost gauge bar 144a, and thus tumble into the short article trough 140. The short intermediate articles, or soupspoons SS have their upper end portions rest against the lowermost gauge bar 144a, but their upper ends clear the next gauge bar 144; so that the soupspoons drop into the short intermediate trough 142a. The next length category, being the long intermediate articles, or forks, have their upper end portions rest against the long intermediate article gauge bar 144 but their upper ends are beneath the long article gauge bar 143. Accordingly, they are guided into the long intermediate article through 142. As in the first form of the device, the long articles, or knives K, have their upper end portions rest against the long article gauge bar 143 which therefore guides them into the long article trough 141.

Proper functioning of the embodiment 110 of the sorting apparatus requires that the short intermediate article gauge bar 144a, which permits teaspoons to pass but retains soupspoons, must be mounted forward of the gauge bar 144, as seen in FIG. 7. In practice, the gauge bar 144a about three-fourths inch forward of the gauge bars 143 and 144.

As is true of the first embodiment of the invention, the gauge bars of the gauge bar means 139 are mounted for vertical adjustment so that the apparatus may be set up to accommodate different silverware sets in which the various pieces differ in length from the corresponding pieces in other sets.

In both embodiments of the invention, it is desirable that the supporting brackets and/or pedestals for mounting the sorting apparatus in the cabinet be adjustable so as to vary the angle of the entire sorter with respect to the horizontal. A substantial amount of experimental operation of sorters embodying the invention indicates that with typical restaurant "silverware" of stainless steel the entire apparatus may advantageously be inclined about 17° from the vertical in the direction of the short article trough 40 or 140. It is anticipated that testing with other types of silverware having a different balance between the handle and the food manipulating end may require that this angle be greater or less than 17°. The 17° angle is between the wall 27 or 127 and the cabinet wall 30, with upper end of the wall 27 or 127 spaced from the wall 30. In addition, there should be a tilt of a few degrees with respect to the transverse cabinet wall 31, so that the upper end of the wall 28 or 128 is slightly farther from the wall 31 than is the lower end of the wall 28 or 128.

It is apparent that by a suitable combination of primary sorting and auxiliary sorting arrangements articles of different lengths may be divided into a large number of categories in each of which all the articles are the same lengths or within a narrow range of lengths. For the purpose of a silverware sorting apparatus, it is apparent that in most instances the four categories are sufficient. However, some restaurants have salad forks, cocktail forks and butter knives in addition to the four basic categories which are sorted by the apparatus disclosed herein; and in practically all types of silverware the different kinds of pieces are of different lengths.

The foregoing detailed description is given for clearness of understanding only and no unnecessary limitations should be understood therefrom, as modifications will be obvious to those skilled in the art.

I claim:

1. Apparatus for rapidly and continuously sorting relatively long, slender articles into a plurality of categories which are differentiated by the length of the articles in each category, said apparatus comprising, in combination:
   indexing means including a generally transversely extending indexing surface;
   a delivery chute which delivers articles of a plurality of categories onto said surface endwise;
   a discharge trough for each category of articles to be sorted, said troughs being inclined and having their upper ends arranged side by side about the periphery of the indexing surface with a short article trough at one side and a long article trough at the other side;
   and a transverse long article gauge bar above the indexing surface and across the upper end of the short article trough, said gauge bar having a free end at the side of the long article trough which is nearer the short article trough;
   the indexing surface being so arranged that articles falling onto it endwise from the chute have their upper ends swing outwardly toward the short article trough, and the long article gauge bar being so arranged that short articles swing beneath said gauge bar and topple into the short article trough, while long articles have their upper end portions rest against said gauge bar and said long articles pivot laterally about their lower ends on the indexing surface with their upper end portion sliding along the gauge bar toward said free end until they slide off said end and said long articles topple into the long article trough.

2. The apparatus of claim 1 which includes an intermediate article trough between the short article trough and the long article trough, and which also includes an intermediate article gauge bar which is below the long article gauge bar and extends across the short article trough and has a free end at the side of the intermediate trough nearer the short article trough, the intermediate article gauge bar being so positioned that short articles on the indexing surface swing beneath it and topple into the short article trough, and the long article gauge bar being so positioned that intermediate articles swing beneath it and topple into the intermediate article trough after their upper end portions have slid off the free end of the intermediate article gauge bar.

3. The apparatus of claim 2 in which the long article gauge bar and the intermediate article gauge bar are both adjustable with referent to the indexing surface and with reference to each other.

4. The apparatus of claim 2 in which articles of two different categories, one shorter and one longer, topple into one trough, said apparatus includes an auxiliary indexing surface onto which said two different categories are delivered endwise from said one trough, an auxiliary shorter article trough and an auxiliary longer article trough which are inclined and have their upper ends arranged side by side about the periphery of the auxiliary indexing surface, and a transverse longer article gauge bar above the auxiliary indexing surface and across the upper end of the shorter article trough, said longer article gauge bar having a free end at the side of the longer article trough which is nearer the shorter article trough, said auxiliary indexing surface and said longer article gauge bar being arranged relative to the auxiliary troughs as are the indexing surface and the long article gauge bar relative to the discharge troughs.

5. The apparatus of claim 4 which is proportioned to sort articles consisting of table silverware in which the long articles are knives, the intermediate articles are forks, and the articles of two different categories are soupspoons and teaspoons both of which topple into the short article trough.

6. The apparatus of claim 4 in which the longer article gauge bar is adjustable with reference to the auxiliary indexing surface and in which the long article gauge bar and the intermediate article gauge bar are both adjustable with reference to the indexing surface and with reference to each other.

7. The apparatus of claim 2 in which both the gauge bars are arcs of substantially concentric circles struck about a restricted indexing area of the indexing surface.

8. The apparatus of claim 7 in which the indexing means includes means that guide the lower ends of articles from the delivery chute into said restricted indexing area.

9. The apparatus of claim 1 which includes a shorter intermediate article trough contiguous to the short article trough, a longer intermediate article trough contiguous to the long article trough, and which also includes a longer intermediate article gauge bar and a shorter intermediate article gauge bar which are spaced below the long article gauge bar in that order, said longer and shorter intermediate article gauge bars extending across the upper end of the short article trough at a high enough level that short articles swing beneath both of them, and said longer and shorter gauge bars having free ends, respectively, adjacent the sides of said longer and shorter intermediate article troughs which are closer to the short article trough, shorter intermediate articles which rest on the indexing surface having their upper ends at a level between said intermediate article gauge bars, and longer intermediate articles resting on said surface having their upper ends at a level between said longer intermediate article gauge bar and said long article gauge bar.

10. The apparatus of claim 9 which is proportioned to sort articles consisting of table silverware in which the long articles are knives, the short articles are teaspoons, the shorter intermediate articles are soupspoons and the longer intermediate articles are forks.

11. The apparatus of claim 9 in which all the gauge bars are adjustable with reference to the indexing surface and with reference to one another.

12. The The apparatus of claim 1 in which the indexing means also includes a pair of converging, generally upright guide surfaces which cooperate with the indexing surface to form an upwardly and outwardly open indexing pocket into which the lower ends of articles from the delivery chute are guided by all said surfaces.

13. The apparatus of claim 12 in which the indexing surface is inclined rearwardly into the convergence of the guide surfaces.

14. The apparatus of claim 13 in which the gauge bar is an arc of a circle struck about the pocket.

15. The apparatus of claim 1 in which the indexing means includes means that guide the lower ends of articles from the delivery chute into a restricted indexing area of the indexing surface, and in which the gauge bar is an arc of a circle struck about said restricted indexing area.

16. The apparatus of claim 1 which includes means for admitting articles to the delivery chute generally in dispersed relationship to one another to minimize clogging of the indexing surface.

17. The apparatus of claim 1 which includes vibratory means to assist in indexing articles on the indexing surface.

18. Apparatus for rapidly and continuously sorting silverware consisting of mixed knives, forks and spoons, said apparatus comprising, in combination:

indexing means including an indexing surface and guide means for causing silverware approaching said indexing surface endwise from above to be guided into a restricted indexing area of said surface;

an infeed chute for feeding silverware endwise toward said indexing surface and guide means;

a spoon through, a fork trough, and a knife through the upper ends of which are side-by-side about the periphery of the indexing surface;

and gauge bar means including a knife gauge bar, and a fork gauge bar below the knife gauge bar, said gauge bars being above the upper ends of the troughs and disposed substantially as arcs of concentric circles about said restricted indexing area, both said gauge bars extending across the upper end of the spoon trough with the fork gauge bar having a free end at the side of the fork trough which is nearer to the spoon trough and with the knife gauge bar having a free end at the side of the knife trough which is nearer the fork trough, the distance from the restricted indexing area to the fork gauge bar being greater than the length of a spoon but less the length of a fork, and the distance from said area to the knife gauge bar being greater than the length of a fork but less than the length of a knife;

said indexing means being so arranged that all pieces of silverware land endwise in the restricted indexing area and tilt outwardly about their lower ends toward the spoon trough, spoons swing beneath the fork gauge bar and tumble into the spoon trough, while forks and knives have their upper end portions rest against the respective gauge bars, and the arrangement of the gauge bars relative to the indexing area being such that forks and knives then tilt laterally about their respective lower ends so their upper end portions slide along the respective gauge bars toward and off the respective free ends of said bars so as to tumble, respectively, into the fork trough and into the knife trough.

19. The apparatus of claim 18 in which the spoon trough is a teaspoon trough, there is a soupspoon trough between the teaspoon trough and the fork trough, and a soupspoon gauge bar is positioned below and substantially concentric with the fork and knife gauge bars, said soupspoon gauge bar extending across the teaspoon trough and having a free end at the side of the soupspoon trough which is nearer the teaspoon trough, and said soupspoon gauge bar being spaced from the restricted indexing area by a distance greater than the length of a teaspoon but less than the length of a soupspoon, and the distance from said area to the fork gauge bar being greater than the length of a soupspoon.

20. The apparatus of claim 18 in which the distance from the restricted indexing area to the fork gauge bar is greater than the length of a soupspoon, and both teaspoons and soupspoons tumble into the spoon trough, and in which said trough drops said spoons endwise onto an auxiliary indexing surface where auxiliary guide means guide their lower ends into a restricted indexing area of said auxiliary indexing surface, there being a teaspoon trough and a soupspoon trough the upper ends of which are side-by-side at a periphery of said indexing surface, and there being a soupspoon guide bar which extends across the upper end of the teaspoon trough has a free end at the side of the soupspoon trough which is nearer the teaspoon trough, the distance from the restricted indexing area of the auxiliary indexing surface to the soupspoon guide bar being greater than the length of a teaspoon but less than the length of a soupspoon, the arrangement of the auxiliary indexing surface being such that all spoons land endwise in the restricted area of said surface and tilt outwardly about their lower ends toward the teaspoon trough, the teaspoons swinging beneath the soupspoon gauge bar so as to tumble into the teaspoon trough while the upper end portions of the soupspoons slide along the soupspoon gauge bar toward and off the free end of said gauge bar so the soupspoons tumble into the soupspoon trough.

* * * * *